Patented Sept. 18, 1934

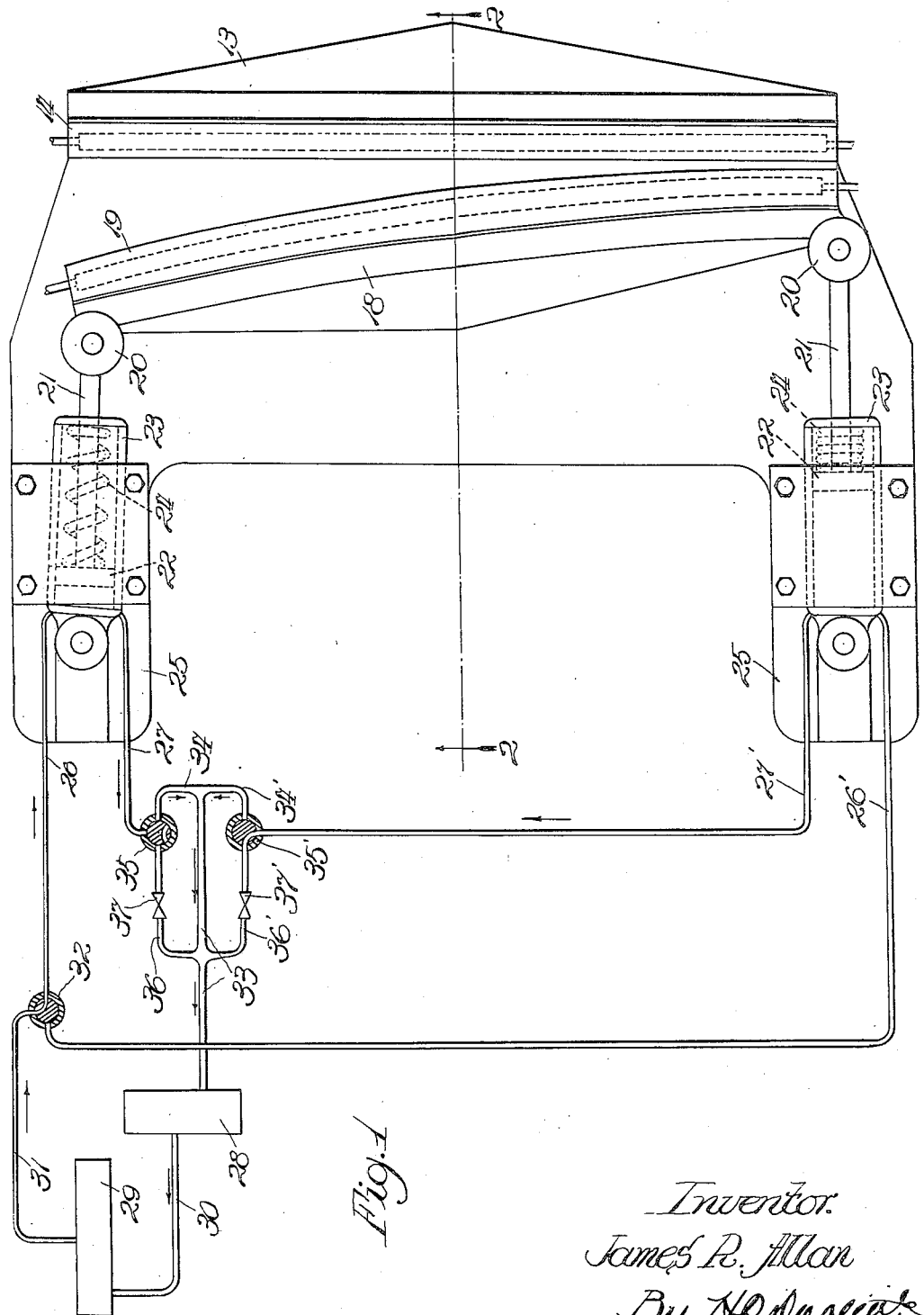

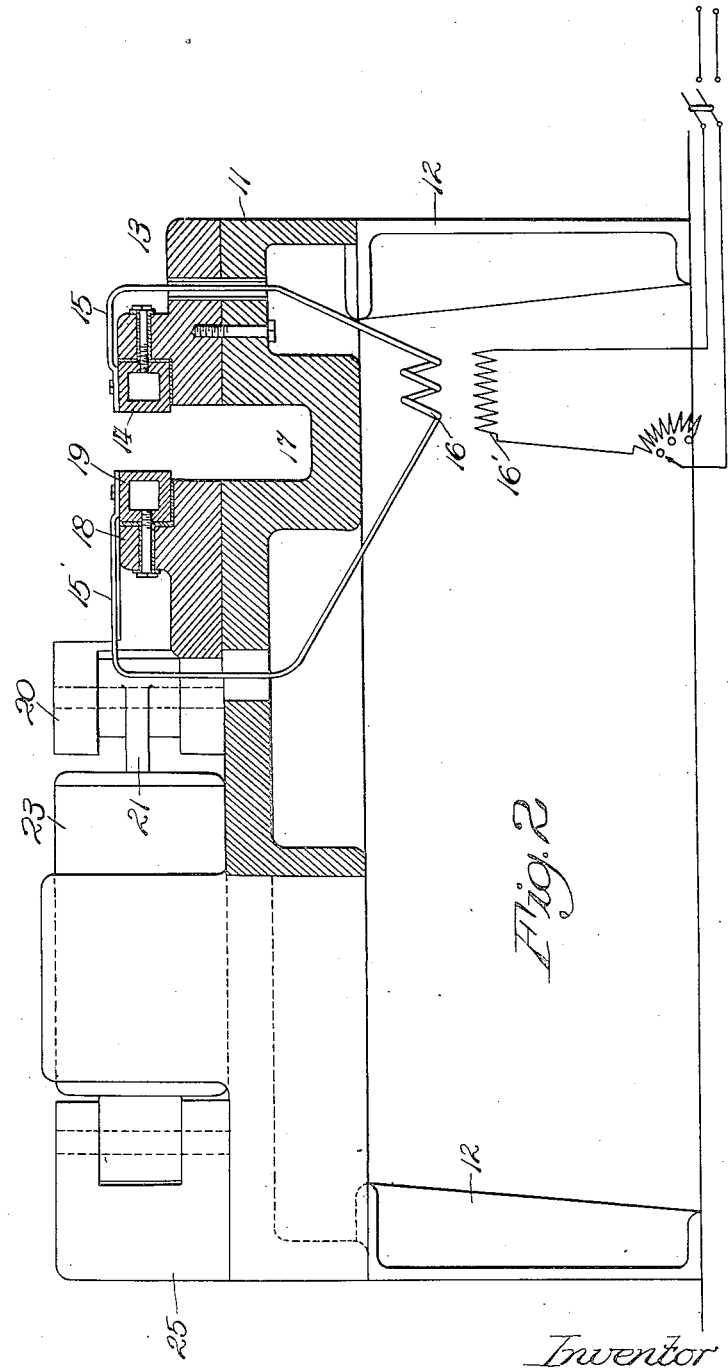

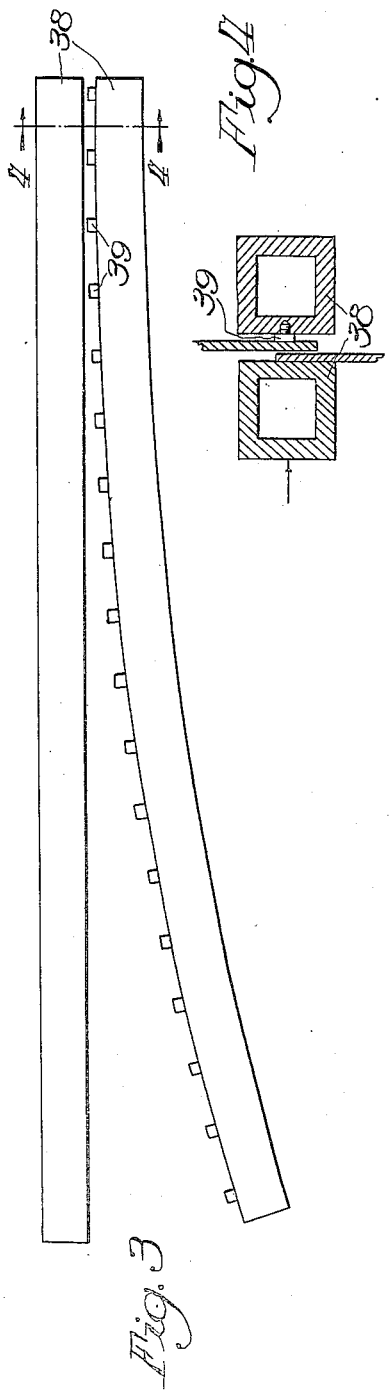
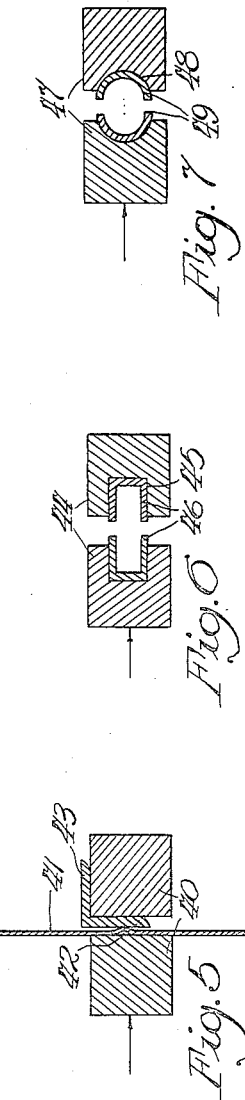
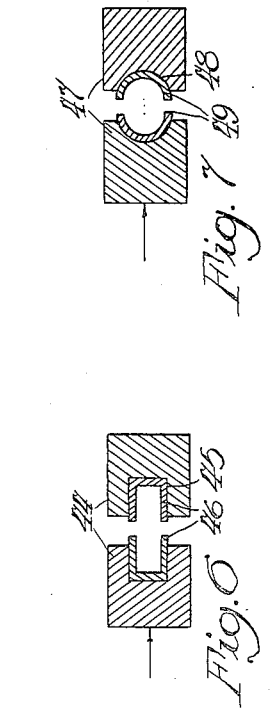
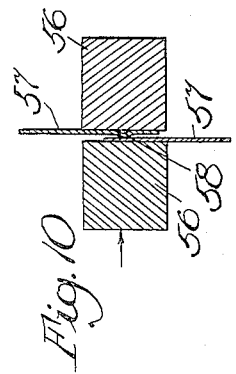
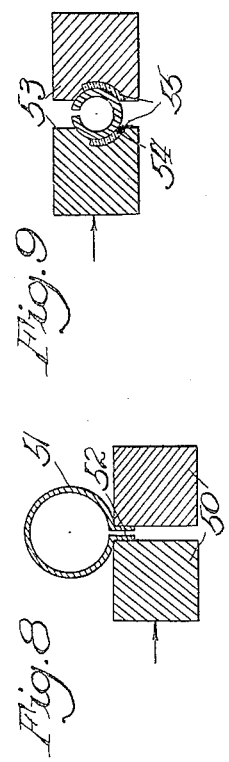
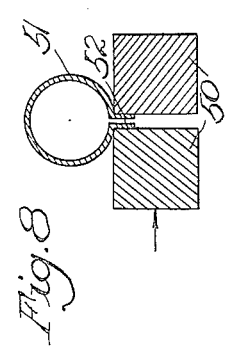

1,973,972

UNITED STATES PATENT OFFICE 1,973,972

WELDING MACHINE

James R. Allan, Oak Park, Ill.

Application January 14, 1931, Serial No. 508,726

7 Claims. (Cl. 219—4)

This invention relates to a welding machine. More specifically it relates to a machine for performing electric fusion welding.

A principal object of the invention is to provide an electric welding machine for fusion welding of a novel construction, capable of being operated to perform continuous or intermittent butt and seam welding, and progressive spot or projection welding. Another object is to provide a machine adapted to perform individual welding operations on individual pieces of work successively. Another more specific object is to devise and construct a machine particularly adaptable for welding relatively long seams or joints. Another object is to construct a machine for performing long butt welds progressively whereby a small current is consumed and a small transformer capacity is necessary. Another object is to provide means for operating a machine constructed according to the invention, by suitable means such as hydraulic means.

The objects of the invention are accomplished by the provision and operation of a machine, one embodiment of which is shown in the drawings and described in detail hereinafter. The basic idea of the invention is accomplished by the relative movement of two electrodes along two pieces of work to be welded whereby successive portions of the work are brought into electrical contact and supplying electric current to the respective electrodes thru the respective pieces of work. This construction makes possible the welding of long seams or joints in material of substantial thickness; it being, of course, necessary to provide electrodes equivalent to the length of the seam or juncture being formed by the welding operation. The same general type of machine, having long electrodes and means operative to bring successive operations of the electrodes into welding position, may be utilized for welding a plurality of small pieces of work by providing means for holding one set of elements to be welded in spaced relation along one electrode and for holding a plurality of aligned elements on the other electrode. A preferred form of the invention embodies a stationary electrode and a movable electrode arranged on an arc whereby said electrode may be rocked to successively bring portions of said electrode into welding relation with respect to the stationary electrode.

In the drawings Figure 1 is a plan view, diagrammatically illustrating the essential features of a machine embodying the invention;

Figure 2 is a cross section taken on the line 2—2 of Figure 1; means also being diagrammatically illustrated for supplying electrical energy to the machine;

Figure 3 shows a pair of electrodes, one of which is provided with spot welding tips;

Figure 4 is a cross section taken on the line 4—4 of Figure 3, showing two pieces of metal in position for being spot welded;

Figure 5 illustrates a particular projection welding operation which may be performed on the machine;

Figure 6 shows electrodes and channels positioned therein to be welded into a pipe rectangular in cross section;

Figure 7 is a cross section showing a pair of electrodes formed to receive semi-circular sections to be welded into a pipe;

Figure 8 is a cross section showing a pair of electrodes and a one-piece metal element formed to be welded by one seam into a pipe;

Figure 9 shows another modified form of electrode for butt welding tubes, and

Figure 10 is a cross section showing an operation in the performing of a progressive continuous seam weld.

As illustrated, the welding machine comprises a heavy metal table 11, provided with legs 12. At one side of the table a strong support 13 is rigidly secured to the table. An electrode 14 is fitted in a recess formed in the support 13 and insulated from and rigidly secured thereto. A heavy conductor 15 is secured to the electrode for the conduction of a welding current thereto. The conductor 15 leads to the secondary 16 of a transformer. The table 11 is formed with a deep channel 17 extending below the outward surface of the electrode 14 to provide clearance for inserting material into welding position or the table may be left open within the working range of the electrodes and the table reinforced at the ends to secure strength. A member 18 is slidably mounted on the table in spaced relation to the support 13, along the opposite side of the channel 17. An electrode 19, similar to the electrode 14 and positioned in horizontal alignment with said electrode, is rigidly secured in a recess to the member 18 but insulated therefrom. The member 18 is formed as the arc of a circle of a comparatively large diameter, the electrode 19 having the same curvature. A conductor 15' is connected to said electrode and to the secondary 16 of the transformer, diagrammatically illustrated. The primary 16' of the transformer is connected to a suitable source of electrical energy, a rheostat being provided for regulating the energy supplied to the transformer. Both the rigid support 13 and the member 18 are provided with reinforcing extensions to prevent the distortion of said elements upon the application of pressure. At one end of the member 18 spaced extensions 20 are provided for pivotally attaching links in the form of rods 21 by means of pins extending through said extensions and through enlarged heads formed at the ends of the rods. The rods 21 are attached to pistons 22 and formed thereby connecting rods by which movement of the pistons 22 are transmitted to the ends of the member 18. The pistons 22 are mounted in slidable cylinders 23. Springs 24 are provided between the forward ends of the cylinders and the pistons. The cylinders 23 are positioned in guides formed by upstanding extensions on the table 11. The space formed by said guides is wider at the forward end than at the rear end of the cylinders to provide for oscillation of the cylinders, which are pivotally mounted at their rear ends on vertical axes to supports 25 rigidly secured to the table 11. The rods 21, the pistons 22 and the cylinders 23 form extensible linkages by which pressure may be applied at will to the respective ends of the movable electrode.

The cylinders are provided with inlet conduits 26 and 26' and outlet conduits 27 and 27' for the delivery thereto and therefrom of a liquid for hydraulically operating the pistons in the cylinders and thereby rocking the member 18 which carries the movable electrode. A liquid reservoir 28 and hydraulic pump 29, and suitable piping and valves comprise means for alternately delivering liquid to the cylinders and for regulating discharge of liquid therefrom. A pipe 30 connects the reservoir to the intake of the pump 29. A discharge pipe 31 from the pump is connectible by means of a three-way valve 32 with either of the pipes 26 or 26'. A pipe 33 is connected by means of branches 34 and 34' and three-way valves 35 and 35' with the pipes 27 and 27'. The valves 35 and 35' are also operative to connect the pipes 27 and 27' with pipes 36 and 36' communicating with the pipe 33. Relief valves 37 and 37' are provided in said pipes for a purpose to be hereinafter described.

Figures 4 to 10 inclusive show types of work which can be performed on a machine of the type above described with a slight alteration in some cases of the shape and arrangement of the electrode. Figures 3 and 4 show a pair of electrodes 38, the curved electrode of which is provided with a plurality of spot welding tips 39 arranged in spaced relation along said electrode. In the operation of the device the spot welding tips are first brought into contact at one end and successively brought into contact thereafter by rocking the electrode carrying the tips until the other end of the electrode has been reached. The sectional view of Figure 4 shows hollow electrodes, as also shown by Figures 1 and 2. Said electrodes may be supplied with a cooling fluid, as is well known in this art.

Figure 5 shows a pair of electrodes 40 having plain surfaces, and illustrates how such electrodes may be used in the machine of this invention to projection weld a plate 41 formed with a plurality of projections 42 to an angle bar 43.

Figure 6 shows a pair of electrodes 44 provided with recesses 45, into which channels 46 are fitted with their open sides in alignment, whereby said channels may be butt welded into a tube rectangular in cross section.

Figure 7 shows a pair of electrodes 47 provided with recesses 48, into which semi-cylindrical elements 49 are fitted for being butt welded into a tubular pipe.

Figure 8 shows a pair of electrodes 50 and, in welding position, a one-piece cylindrical member 51 provided with a pair of parallel flanges 52 positioned between the electrodes for progressive seam welding to form a tubular pipe.

Figure 9 shows a pair of electrodes provided with cylindrical recesses 54, the lower portions of which are provided with insulation 55 whereby, in butt welding a tubular pipe from a one-piece blank, the current may be applied to the blank at small areas along each side of the weld.

Figure 10 shows a pair of electrodes 56 with plates 57 in position for being semi-welded together, one of said plates being provided with a ridge 58 to form a limited contacting surface.

In the operation of the machine, as above described, current is supplied by means of the transformer and the conductors 15 and 15' to the respective electrodes. As previously stated, water may be circulated through the electrodes to prevent overheating. The work to be operated upon is positioned between the electrodes and held in welding position therebetween by any suitable means. As pointed out in the description of Figures 3 to 10, the particular type of work to be done may be of widely different natures. The operation of the machine is, however, substantially the same for all the modifications shown or for other modifications which are contemplated, in which a plurality of individual pieces of work are arranged along the electrodes to be successively welded. The essential feature of the machine is to provide means for progressively bringing adjacent portions of the electrodes into welding relationship with the work. The particular means which has been shown in the embodiment of the invention for relatively moving the electrodes is only a preferred embodiment; other means may be utilized within the scope of the invention. It is to be understood that due to the long radius of curvature of the movable electrode only a very small angular movement is required to rock the electrode along the fixed stationary electrode.

As is well known in the welding art, it is necessary in machines for performing work of this nature, to positively apply a very considerable pressure to the surfaces being welded. The hydraulic means illustrated is effective to perform this operation. By arranging the various three-way valves, as shown in Figure 1, liquid is supplied by the pump 29 from the reservoir 28, through the pipe 31, the valve 32, and the pipe 26, to the cylinder 23, thereby moving the piston in said cylinder forwardly and rocking the electrode carrying member 18 with respect to the electrode 14. The pipe 26' is closed during this phase of the operation by the valve 32, as shown. The valve 35' is arranged to provide communication between the discharge pipe 27' from the cylinder 23' and the pipe 36', leading to the pipe 33 and to the reservoir 28. The relief valve 37' is adjustable and is regulated to provide for a restricted flow of liquid from the cylinder 23' at such a rate that the piston may drop back in said cylinder at the same rate that the piston is moving forward in the cylinder 23. The relief valve provides an adjustable resistance whereby the desired pressure may be exerted on the work by the rocking electrode as it progressively moves forward along the stationary electrode. When the moving electrode has reached the end of a cycle of operation, the beginning of which is shown in Figure 1, the positions of the valves 32, 35 and 35' are altered so that the movable electrode may be rocked back to its original position in a similar manner, at the same time performing an identical welding operation. The by-pass pipes 34 and 34', together with the three-way valves 35 and 35', provide means for relieving the pressure in the cylinders, whereby the springs 24 move both pistons in the cylinders to withdraw the movable electrode away from the stationary electrode.

In addition to the wide variation of electrodes which may be used, it is to be understood that this machine may be operated with either direct or alternating current, it being necessary to provide means other than the transformer shown, for supplying direct current. With the use of direct current it is possible to obtain a continuous fusion weld. With alternating current it is possible to obtain a so-called stitch welding effect or an interrupter may be used for interrupting the current, timed with the movement of the moving electrode, for obtaining a similar type of weld. A machine as described, is particularly adaptable to butt weld or seam weld long lengths, for example, ten, fifteen, twenty, or even forty feet. In previous types of butt welding machines it has been rather difficult to accomplish long welds as when the weld is made in one operation, very heavy welding machine construction is necessary and tremendous transformer capacities are required to make a complete butt weld the full length of the piece simultaneously. One of the salient features of the welding machine of this invention is due to the fact that only a point of the moving electrode is tangent to the work and stationary electrode at one time. A very small contact area for passage of the welding current is obtained at any one time. This area moves progressively from end to end as the moving electrode is rocked. Due to this fact it is not necessary to use a large transformer, as would be the case if the whole length of the pieces were to be welded simultaneously. This is a particularly valuable feature because large welder transformers cause a tremendous load on any electrical system. It is also possible with the machine of this invention to use more than one welder transformer if the length of the electrodes is great enough to require it. This can be accomplished by insulating segments or sections of the electrodes from one another on the electrode supports and connecting each section or segment of electrode to its own transformer.

While I have shown the welding machine in horizontal position, it is entirely feasible to put it in any other position.

It is also to be understood that the shapes of the electrodes are not limited to the form shown. In particular types of work the electrodes may both be curved. Several of the modified constructions have been shown in the drawings and the possibilities of the machine constituting the invention have been discussed above.

It is to be understood that applicant limits his invention only by the scope of the appended claims.

What is claimed is:

1. A welding machine comprising a frame structure, two electrodes mounted on said frame structure, one of said electrodes being curved on a large radius whereby successive portions of the two electrodes may be brought into welding position by a slight angular rocking movement of one of the electrodes, means for rocking one of the electrodes with respect to the other, said means including controllable pressure applying means at each end of the movable electrode, and means for supplying current to the electrodes.

2. A welding machine comprising a frame structure, two electrodes mounted on said frame structure one of which is movable with respect to the other, one of said electrodes being curved on a large radius whereby successive portions of the two electrodes may be brought into welding position by a slight angular rocking movement of one of the electrodes, extensible linkages connected to the frame structure and to the respective ends of the movable electrode, and means for retracting one linkage and simultaneously extending the other linkage whereby successive portions of the electrodes will be brought into welding relationship.

3. A welding machine comprising a substantially straight stationary electrode, a curved electrode movable to be brought into welding relationship with successive portions of the stationary electrode, actuating linkages connected to the respective ends of the movable electrode, and means to differentially actuate said linkages whereby the movable electrode is rocked with respect to the stationary electrode.

4. A welding machine comprising a substantially straight stationary electrode, a curved electrode movable to be brought into welding relationship with successive portions of the stationary electrode with a continuous welding contact, actuating linkages connected to the respective ends of the movable electrode, means to differentially actuate said linkages whereby the movable electrode is rocked with respect to the stationary electrode, and means for supplying a welding current to the electrodes during said rocking movement.

5. A welding machine comprising a substantially straight stationary electrode, a curved electrode, one of said electrodes being movable with respect to the other, actuating links pivotally connected to the respective ends of the movable electrode, means to apply pressure to one of said links to bring one end of the movable electrode into welding position with respect to the stationary electrode, means for releasing said pressure, and means for applying pressure on the link at the other end of the movable electrode, said means and the means for releasing the pressure on the first named link being operated simultaneously whereby successive portions of the electrodes are brought into welding position.

6. A welding machine comprising a substantially straight stationary electrode, a curved electrode, one of said electrodes being movable with respect to the other, actuating links pivotally connected to the respective ends of the movable electrode, means to apply pressure to one of said links to bring the removable electrode into welded position with respect to the stationary electrode, means for gradually reducing said pressure, and means for gradually applying an increasing pressure on the link at the other end of the movable electrode, said means and the means for releasing the pressure on the first named link being operated simultaneously whereby successive portions of the electrodes are brought into welding position with a substantially uniform engaging pressure.

7. A welding machine comprising a frame structure, two electrodes mounted on said frame structure one of which is movable with respect to the other, one of said electrodes being curved on a large radius whereby successive portions of the two electrodes may be brought into welding position by a slight angular rocking movement of one of the electrodes, extensible linkages connected to the frame structure and to the respective ends of the movable electrode, each extensible linkage consisting of a cylinder pivotally connected to the frame structure, a piston in the cylinder pivotally connected to the electrode, a source of fluid under pressure, and means for retracting one linkage and simultaneously extending the other linkage consisting of valve means for regulating the flow of fluid to and from the cylinders whereby successive portions of the electrodes will be brought into welding relationship.

JAMES R. ALLAN.